United States Patent
Matsumoto et al.

(10) Patent No.: US 6,450,910 B1
(45) Date of Patent: Sep. 17, 2002

(54) LINK PLATE FOR SILENT CHAINS AND METHOD OF PRODUCING THE SAME

(75) Inventors: Masaaki Matsumoto; Koichi Inoko, both of Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/585,833

(22) Filed: Jun. 1, 2000

(30) Foreign Application Priority Data

Jun. 2, 1999 (JP) ............................................ 11-155677

(51) Int. Cl.⁷ ......................... F16G 13/04; F16G 13/02
(52) U.S. Cl. ...................................... 474/212; 474/206
(58) Field of Search ................................. 474/206, 212, 474/213, 214, 215, 216, 217, 202, 230–231

(56) References Cited

U.S. PATENT DOCUMENTS

| | | | |
|---|---|---|---|
| 1,952,885 A | 3/1934 | Oakes | 474/213 |
| 4,342,560 A * | 8/1982 | Ledvina et al. | 474/213 |
| 4,642,078 A * | 2/1987 | Dupoyet | 474/231 |
| 4,741,725 A | 5/1988 | Ingold | 474/212 |
| 5,066,265 A | 11/1991 | Wu | 474/206 |
| 5,073,153 A | 12/1991 | Wu | 474/206 |
| 5,098,349 A | 3/1992 | Wu | 474/206 |
| 5,176,584 A | 1/1993 | Ishida et al. | 474/206 |
| 5,465,568 A | 11/1995 | Wang | 474/206 X |
| 5,741,196 A | 4/1998 | Campagnolo | 474/206 X |

FOREIGN PATENT DOCUMENTS

FR  2654171  5/1991 ............... 474/206

* cited by examiner

*Primary Examiner*—David A. Bucci
*Assistant Examiner*—Marcus Charles
(74) *Attorney, Agent, or Firm*—Howson & Howson

(57) ABSTRACT

A link plate for silent chains includes a circumferential edge beveled to a greater extent at at least one of opposite longitudinal ends of the link plate than at another part including a pair of link teeth, so as to form a tapered butt-inserting portion which enables smooth intermeshing engagement of the link plate relative to a pair of laterally spaced ones of such link plates when the link plates at opposite ends of an elongated chain is connected together to form an endless chain.

3 Claims, 3 Drawing Sheets

LINK PLATE FOR SILENT CHAINS AND METHOD OF PRODUCING THE SAME

BACKGROUND OF THE INVENTION

1. Field of the Invention

The present invention relates to a link plate for silent chains and a method of producing the link plate.

2. Description of the Related Art

A silent chain which is used as a timing chain for an engine, a power drive chain for a transmission and so on includes a large number of link plates articulately connected together in an endless fashion by means of pins with the link plates being interleaved in transverse and longitudinal directions of the chain. Each of the link plates has a pair of link teeth designed to engage or mesh with teeth of a sprocket at inner flanks or outer flanks thereof for achieving power transmitting operation.

The conventional silent chain is generally manufactured in the manner as described below: A coiled sheet metal while being unwound is fed longitudinally through successive working positions. While the sheet metal is at rest at a first working position, a pair of pin holes is formed in the sheet metal by means of a punch, and at a second or next subsequent working position, a link plate is blanked out from the sheet metal by means of a blanking punch. In another conventional manufacturing process, a link plate blank having substantially the same outline as a finished link plate is blanked out from sheet metal, and subsequently a pair of pin holes is punched in the link plate blank, thereby producing a link plate. A number of such link plates are articulately connected together by means of pins so as to form an elongated chain with the link plates being interlaced with each other in both transverse and longitudinal direction of the chain. Thereafter, the elongated chain of link plates is cut off into desired lengths which are determined according to the application or use of a finished silent chain. The link plates at opposite ends (a leading end and a trailing end) of the desired length of chain are then abutted together in an intermeshing fashion and joined together by a pin, thus forming an endless chain.

In order to facilitate easy intermeshing between the link plates at the leading and trailing ends of the desired length of chain, and also to obtain flat link plates free from local wear, a burring process or a grinding process is carried out during the manufacture of the link plates in such a manner that the circumferential edges of the link plates are uniformly chamfered or rounded throughout the length thereof into beveled or rounded surfaces.

However, the aforementioned link plate matching process is usually achieved by manual operation and difficult to automate because it involves an alignment for bringing together two groups of laterally spaced link plates into intermeshed condition at the leading and trailing ends of the desired length of chain.

To facilitate easy matching of the link plates, it becomes necessary to make a chamfer on a matching part of the link plate as large as possible. There arises a problem however that the burring or grinding process requires a long working time for providing such large chamfering. This reduces productivity and also results in deterioration of the fatigue strength of the link plates.

In addition, since an unnecessary part of the circumferential edge of each link plate, that is, an engagement surface on each link tooth of the link plate is also chamfered greatly, engagement surfaces on the link teeth of the link plate are narrowed. When used with a sprocket, the link plate having such narrowed engagement surfaces exerts a great pressure or force on a toothed surface of the sprocket, tending to produce abnormal wear on the toothed surface of the sprocket.

SUMMARY OF THE INVENTION

With the foregoing drawbacks of the prior art in view, it is an object of the present invention to provide a link plate for silent chains which is capable of being smoothly matched or intermeshed with similar link chains when opposite ends of an elongated chain are abutted together to form an endless chain, which enables automated assembly of the chain, and which is capable of reducing wear on the toothed surface of a sprocket.

Another object of the present invention is to provide a method of producing such link plate which can reduce the necessary working time of the burring or a grinding process, thereby increasing productivity.

According to a first aspect of the present invention, there is provided a link plate for a silent chain, having a pair of pin holes formed therein, a pair of link teeth on one side thereof extending in a longitudinal direction of the chain, and a butt-inserting portion formed at at least one of opposite ends thereof in the longitudinal direction of the chain, wherein the butt-inserting portion has a thickness decreasing gradually toward a circumferential edge of the link plate at said at least one end of the link plate.

For making a silent chain, a plurality of such link plates are articulately connected together by means of pins so as to form an elongated chain in which the link plates are interleaved in both a transverse direction and a longitudinal direction of the chain. Then, opposite ends of the elongated chain are joined together by a pin in which instance by virtue of the butt-inserting portions, the link plates at the opposite chain ends can be smoothly intermeshed with each other. This is because the butt-inserting portion is tapered and hence it can provides a clearance between one link plate at one end of the elongated chain and an adjacent link plate at the other end of the elongated chain when the two link plates are brought or abutted together from opposite directions into a laterally juxtaposed condition. By thus provided clearance, the two link plates can be smoothly brought together into such laterally juxtaposed condition without interference even when the directions of movement of the two plates being abutted are misaligned to some extent.

In one preferred form, the butt-inserting portion of the link plate is comprised of a beveled surface formed on at least a front surface or a rear surface of the link plate. The butt-inserting portion may be provided at the opposite ends of the link plate and comprised of a beveled surface formed on the front and rear surfaces of the link plate. The beveled surface preferably has a generally fan shape with its pivot located at the circumferential edge of the link plate at each end of the link plate.

In another preferred form, the circumferential edge on at least one of a front surface and a rear surface is beveled to a greater extent at said at least one end of the link plate than at a remaining portion of the link plate including the link teeth. The butt-inserting portion includes such beveled circumferential edge of the link plate at said at least one end of the link plate. The beveled circumferential edge preferably has a generally fan shape with its pivot located at the circumferential edge of the link plate at said at least one end of the link plate.

According to another aspect of the present invention, there is provided a method for producing a link plate for a silent chain, the link plate having a pair of pin holes formed therein, a pair of link teeth on one side thereof extending in a longitudinal direction of the chain, and a butt-inserting portion formed at at least one of opposite ends thereof in the longitudinal direction of the chain, the butt-inserting portion having a thickness decreasing gradually toward a circumferential edge of the link plate at said at least one end of the link plate. The method comprises the steps of: feeding a coiled sheet metal intermittently along a path while unwinding the coiled sheet metal; in synchronism with the intermittent feed of the sheet metal, depressing the sheet metal from at least one side thereof so as to form a depressed portion in at least one of a front surface and a rear surface of the sheet metal, the depressed portion having a sloped bottom surface facing in one direction for forming a butt-inserting portion of a link plate to be produced; in synchronism with the intermittent feed of the sheet metal, punching a pair of pin holes in the sheet metal at respective positions predetermined with respect to the depressed portion; and thereafter, in synchronism with intermittent feed of the sheet metal, die-cutting a link plate out from the sheet metal while using the pin holes as a reference position so that a circumferential edge of the die-cut link plate extends across the depressed portion to thereby form a butt-inserting portion.

The depressing may be achieved such that two depressed portions are formed in a spaced relation in the front surface or the rear surface of the sheet metal. As an alternative, the depressing may be effected from opposite sides of the sheet metal so that the depressed portion is formed in both the front surface and the rear surface of the sheet metal. Preferably, the depressing is effected from opposite sides of the sheet metal such that two depressed portion are formed in a spaced relation in the front and rear surfaces of the sheet metal.

In order to remove a shear drop and a roughened surface which may be produced as a result of the punching and die-cutting processes, inner circumferential surfaces of the punched pin holes and an outer circumferential surface of the link plate may be finished by shaving with suitable shaving tools. The finished or shaved circumferential surfaces have an improved degree of surface roughness and high surface qualities including parallelism.

BRIEF DESCRIPTION OF THE DRAWINGS

A certain preferred embodiment of the present invention will now be described in detail, by way of example only, with reference to the accompanying drawings, in which.

DETAILED DESCRIPTION OF THE PREFERRED EMBODIMENT

The following description is merely exemplary in nature and is in no way intended to limit the invention or its application or uses.

Figure 1A:
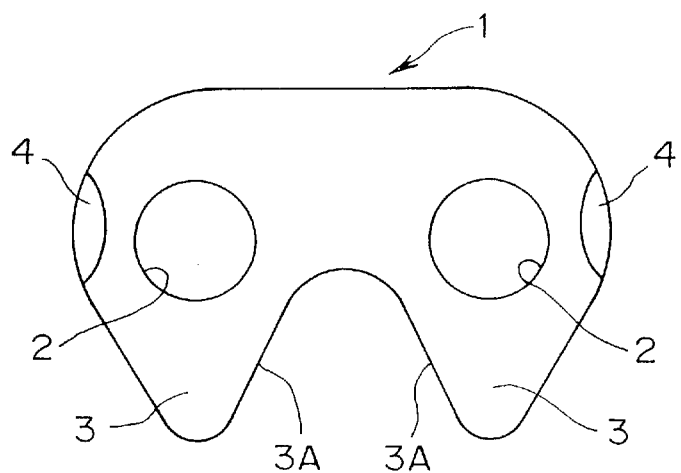
FIG. 1A is a front elevational view of a link plate for a silent chain according to an embodiment of the present invention.

Referring now to the drawings and FIG. 1A in particular, there is shown a link plate for silent chains according to an embodiment of the present invention. The link plate 1 has a pair of pin holes 2, 2 formed therein for receiving respectively therein a pair of pins P (FIG. 2) used for connecting together a plurality of such link plates in both a widthsise (transverse) direction and a longitudinal direction of a chain, and a pair of link teeth 3, 3 formed at one side of the link plate which extends in a longitudinal direction of the chain. The link teeth 3, 3 are adapted to be engaged with teeth of a sprocket (not shown) at their engagement surfaces 3A, 3A formed on inner flanks of the link teeth 3, 3.

The link plate 1 further includes a pair of butt-inserting portion 4, 4 formed at opposite longitudinal ends of thereof for facilitating smooth matching or intermeshing engagement of the link plate 1 relative to a pair of laterally spaced ones of similar link plates 1 when the link plates 1 at opposite ends of an elongated chain of link plates are abutted together for connection by a pin, as will be described later. The butt-inserting portions 4, 4 have a thickness decreasing gradually toward a circumferential edge of the link plate 1 at the opposite ends of the link plate 1.

Figure 1B:
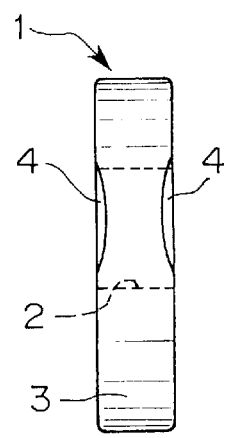
FIG. 1B is a right side view of FIG. 1.
Figure 1C:
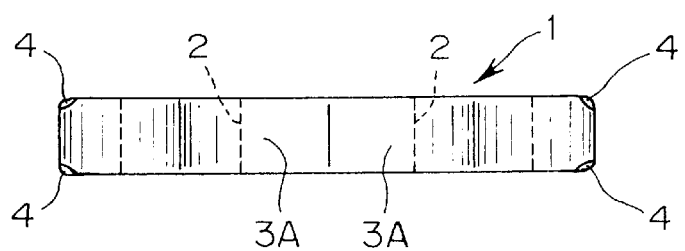
FIG. 1C is a bottom view of FIG. 1.

As shown in FIGS. 1B and 1C, each of the butt-inserting portions 4 is formed on both a front surface and a rear surface of the link plate 1 and takes the form of a beveled surface which is formed by chamfering or beveling the circumferential edge on each surface of the link plate 1 to a greater extent at the opposite longitudinal ends of the link plate 1 than at a remaining part of the link plate 1 including the link teeth 3. The beveled surface (butt-insertion portion) 4, as shown in FIG. 1A, has a generally fan shape with its pivot located at the circumferential edge of the link plate 1 at each longitudinal end of the link plate 1.

The link plate 1 is formed by being punched out from a coiled sheet metal, as will be described later. Inner circumferential surfaces of the pin holes 2, 2, the engagement surfaces 3A, 3A of the link teeth 3, 3, and a circumferential surface at a side opposite to the link teeth 3 are finished by precision shaving so that these surfaces are very smooth and have high parallelism over at least 70% of the thickness of the link plate 1.

Figure 2:
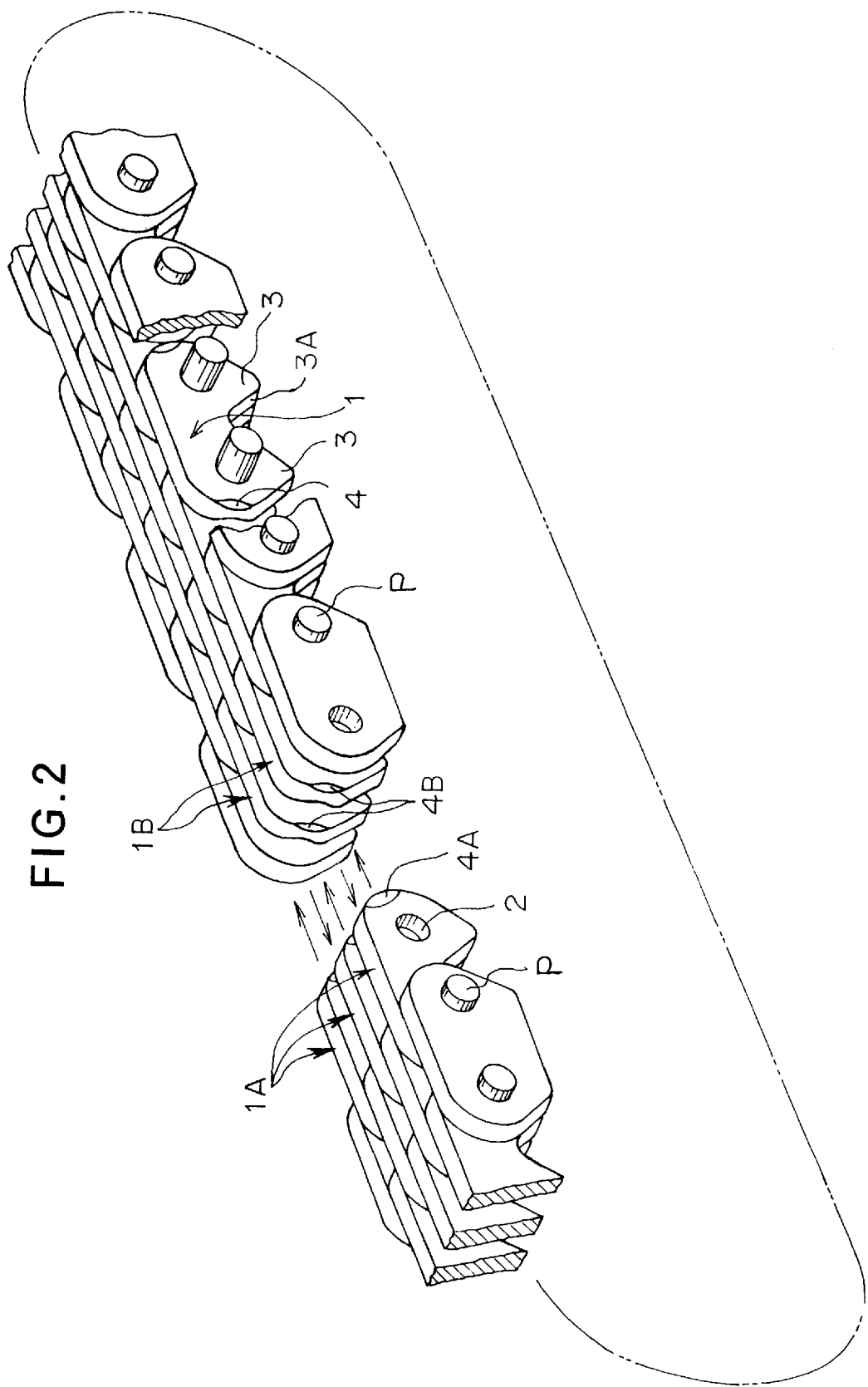
FIG. 2 is a diagrammatical perspective view illustrative of a manner in which the link plates of the present invention are assembled into an endless silent chain.

A multiplicity of such link plates 1 are assembled into a silent chain, as shown in FIG. 2. During that time, a plurality (three in the illustrated embodiment) of laterally spaced the link plates 1A at a leading end of the chain and a plurality (two in the illustrated embodiment) of laterally spaced link plate 1B at a trailing end of the chain are brought together into intermeshing relation for subsequent connection or joining by means of a pin. In this instance, by virtue of the respective butt-inserting portions 4A, 4B comprised of the beveled surfaces, a slight clearance is provided between the link plates 1A and the link plates 1B as they are brought together from opposite directions. This clearance insures that the two link plates 1A and 1B can be smoothly intermeshed with each other without interference even when the directions of movement of the link plates 1A, 1B being abutted together are misaligned to some extent. Thus, the leading and trailing ends of the chain are readily joined together by a pin P, thereby forming an endless silent chain. In addition, since all the link plates 1 have one and the same shape and configuration, it becomes possible to handle the link plates 1 easily during assembling of the chain such that a link-plate joining process for joining opposite ends of an elongated chain to form an endless chain can be automated regardless of variations in the desired length of the chain.

Notwithstanding the fact that the butt-inserting portion 4A, 4B of each link plate 1A, 1B is beveled to a great extent, the engagement surfaces 3A of the link teeth 3 are free from such large beveling and hence have a large surface which is enough to insure smooth meshing engagement with a toothed surface of a sprocket (not shown) without exerting undue high surface pressure or force to the toothed sprocket surface which may otherwise result in abnormal wear of the toothed sprocket surface.

Figure 3:
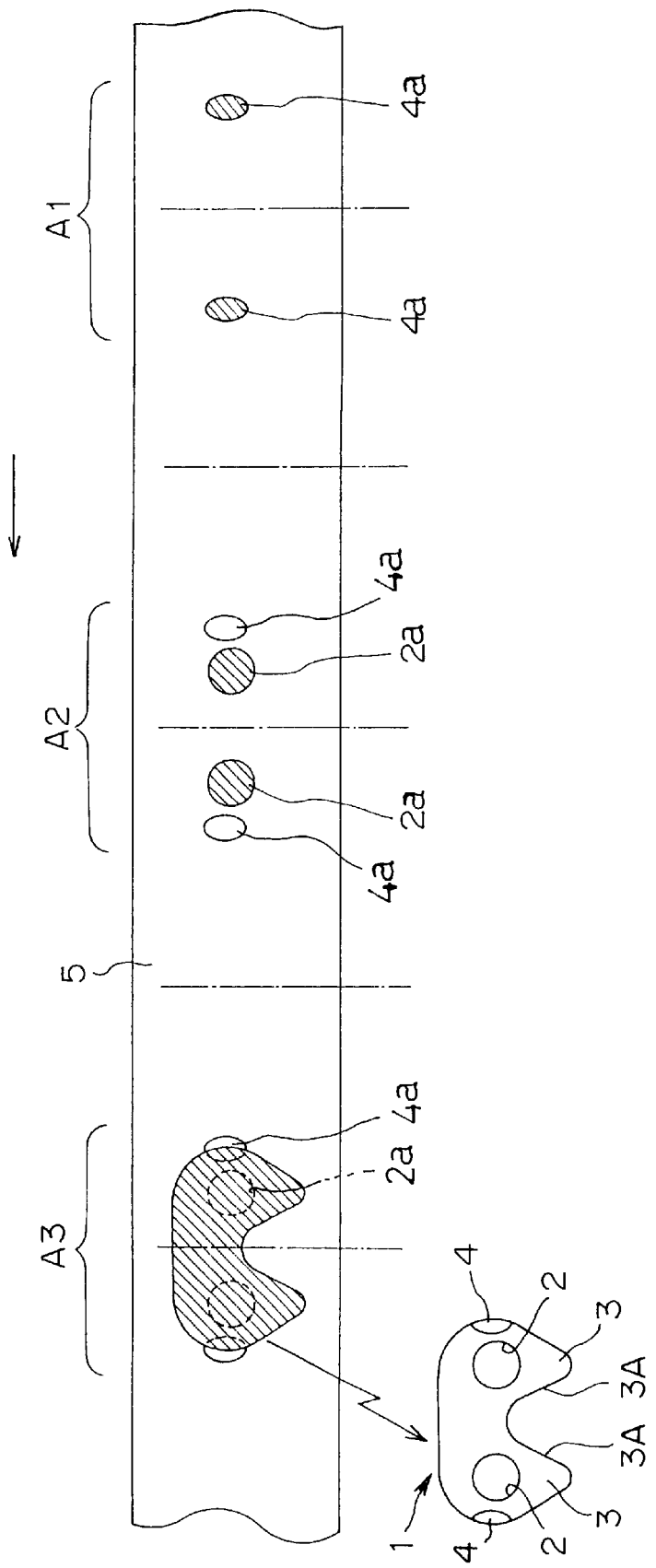
FIG. 3 is a diagrammatical view showing successive processing steps of a method achieved to produce the link plate according to the present invention.

FIG. 3 diagrammatically shows a succession of processing steps of a method for producing the link plate 1 described above with reference to FIGS. 1A–1C.

As shown in FIG. 3, a coiled sheet metal 1 while being unwound is fed longitudinally from the right to the left of this figure through consecutive first, second and third working stations A1, A2 and A3.

At the first working station A1, the sheet metal 5 is depressed from opposite sides thereof with a depressing die (not shown) so that a pair of longitudinally spaced depressed portions or depressions 4a, 4a (indicated by hatching for clarity) is formed on both a front and a rear surface of the sheet metal 5. The depressions 4a, 4a correspond in position to butt-inserting portions 4, 4 of a link plate 1 to be produced and have sloped bottom surfaces facing away from each other.

At the second working station A2, a pair of pin holes 2a, 2a is punched in the sheet metal 5 by means of a punching die (not shown) so that the pin holes 2a, 2a (indicated by hatching for clarity) are positioned relative to the depressions 4a, 4a and correspond in position to a pair of pin holes 2, 2, respectively, of the link plate 1 to be formed.

At the third working position A3, a link plate 1 (indicated by hatching for clarity) is die-cut or blanked out from the sheet metal 5 by means of a blanking die (not shown) while the pin holes 2a, 2a are used as a reference position. In this instance, the die-cutting or blanking is effected such that a circumferential edge of the link plate 1 extends across the depressed portions 4a, 4a. The link plate 1 thus formed has a pair of pin holes 2 formed therein (which is identical to the punched pin holes 2a, 2a), a pair of link teeth 3, 3 on one longitudinal side thereof, and a pair of butt-inserting portions 4, 4 formed at opposite longitudinal ends thereof. The butt-inserting portions 4, 4 are each formed by a portion of a corresponding one of the depressions 4a, 4a. Respective inner flanks of the link teeth 3 form engagement surfaces 3A, 3A.

The depressing process at the first working station A1 and the punching process at the second working station A2 may be carried out simultaneously at the same working station.

It is preferable that between the punching and die-cutting processes achieved at the second and third working stations A2, A3, respectively, a shaving process is carried out to finish circumferential surfaces of the punched pin holes 2a, 2a over at least 70% of the thickness of the sheet metal 5 by using a suitable cylindrical shaving tool having an outside diameter slightly larger than the inside diameter of the pin holes 2a, 2a. By thus achieved shaving process, a roughened surface and a shear drop which may be formed by the preceding punching process are removed, and the finished circumferential surfaces of the pin holes 2a, 2a have improved surface roughness and surface precision including parallelism. Similarly, the die-cutting process achieved at the third working station A3 may be followed by a second shaving process which is effected on an outer circumferential surface of the link plate 1 over at least 70% of the thickness of the link plate 1 by using a hollow shaving die having a contour complementary in shape to, and slightly smaller in size than, the contour of the link plate 1. By the shaving thus achieved, the outer circumferential surface of the link plate 1 is free from a roughened surface and a shear drop and has improved surface qualities including surface roughness and parallelism.

According to the method of the present invention for producing the link plate 1, a burring or a grinding process conventionally achieved before and after the heat treating process of the link plate can be carried out in a short time and thus provides a noticeable improvement in productivity.

As described above, a link plate for silent chains according to the present invention includes a butt-inserting portion formed at at least one of opposite ends thereof in the longitudinal direction of a chain, the butt-inserting portion having a thickness decreasing gradually toward a circumferential edge of the link plate at the at least one end of the link plate. The butt-inserting portion is preferably comprised of a beveled surface. When an elongated chain including a multiplicity of such link plates articularly interleaved by pins is formed into an endless loop shape, a plurality of laterally spaced link plate at one end of the elongated chain and a plurality of laterally spaced link plates at the other end of the elongated chan can be smoothly brought into intermeshing relation because the butt-inserting portion of each link plate provides a clearance between two adjacent link plates being brought together. Thus, an endless silent chain can be produced with utmost ease.

The butt-inserting portion is preferably provided on both a front surface and a rear surface of the link plate and at opposite longitudinal ends of the link plate. By thus arranging the butt-inserting portion, handing of the link plates during chain-assembling operation becomes ease, making it possible to automate the chain-end-joining process which has conventionally been achieved by the human operator.

For forming the butt-inserting portion, a circumferential edge of one or both of a front surface and a rear surface of the link plate is beveled to a greater extent at one or both of both opposite longitudinal ends of the link plate than a remaining part of the link plate including link teeth.

The link teeth can, therefore, posses a large engagement surface for meshing engagement with toothed surface of a sprocket. With this large engagement surface, abrasive wear which may occur on the teeth surface of the sprocket is considerably reduced, and the fatigue strength of the link plate does not deteriorate.

According to a method of the present invention for producing the link plate of the foregoing construction, a butt-inserting portion is produced by depressing sheet metal from at least one side thereof either simultaneously with or before a pair of pin holes is punched in the sheet metal, and die-cutting a link plate out from the sheet metal such that a circumferential edge of the die-cut link plate extends across a depressed portion formed at the depressing step. Since the butt-inserting portion comprised of a beveled surface can be surely formed in a short time by a single depressing process, it becomes possible to considerably shorten the necessary work time of a burring process or a grinding process which has conventionally been effected over a long time both before and after a heat-treatment process of the link plate. The method of the present invention can, therefore, produce the link plate at high production rate.

Obviously, various minor changes and modifications of the present invention are possible in the light of the above teaching. It is therefore to be understood that within the scope of the appended claims, the present invention may be practiced otherwise than as specifically described.

What is claimed is:

1. A link plate for a silent chain, having a pair of pin holes formed therein, the pin holes being spaced from each other along a direction defining a longitudinal direction of the link plate, a pair of link teeth formed on the link plate, the teeth extending transversely to said longitudinal direction, and being in side-by-side relationship to each other and spaced from each other, the spacing of the teeth from each other extending along a direction parallel to said longitudinal direction, and said link plate having a pair of opposite ends along said longitudinal direction, and a butt-inserting portion formed on at least one of said opposite ends of the link plate, said butt-inserting portion having a circumferential edge, and a thickness decreasing gradually, in said longitudinal direction, toward said circumferential edge;

wherein said link plate has a front surface and a rear surface, and said butt-inserting portion of said link plate comprises a beveled surface formed on at least one of the front and rear surfaces of the link plate; and wherein said beveled surface is defined by said circumferential edge and an arc extending from one point on said circumferential edge to another point on said circumferential edge, the arc being convex when viewed from the end of said link plate opposite said one end.

2. A link plate for a silent chain, having a pair of pin holes formed therein, the pin holes being spaced from each other along a direction defining a longitudinal direction of the link plate, a pair of link teeth formed on the link plate, the teeth extending transversely to said longitudinal direction, and being in side-by-side relationship to each other and spaced from each other, the spacing of the teeth from each other extending along a direction parallel to said longitudinal direction, and said link plate having a pair of opposite ends along said longitudinal direction, and a butt-inserting portion formed on at least one of said opposite ends of the link plate, said butt-inserting portion having a circumferential edge, and a thickness decreasing gradually, in said longitudinal direction, toward said circumferential edge;

wherein said link plate has a front surface and a rear surface, and said butt-inserting portion is provided at both of said opposite ends of the link plate and comprising a beveled surface formed on both of the front surface and the rear surface of the link plate; and wherein each said beveled surface is defined by a circumferential edge of the link plate at one of said opposite ends of the link plate and an arc extending from one point on the last-mentioned circumferential edge to another point on said last-mentioned circumferential edge, the arc being convex when viewed from the end of said link plate opposite to said one of said opposite ends.

3. A link plate for a silent chain, having a pair of pin holes formed therein, the pin holes being spaced from each other along a direction defining a longitudinal direction of the link plate, a pair of link teeth formed on the link plate, the teeth extending transversely to said longitudinal direction, and being in side-by-side relationship to each other and spaced from each other, the spacing of the teeth from each other extending along a direction parallel to said longitudinal direction, and said link plate having a pair of opposite ends along said longitudinal direction, and a butt-inserting portion formed on at least one of said opposite ends of the link plate, said butt-inserting portion having a circumferential edge, and a thickness decreasing gradually, in said longitudinal direction, toward said circumferential edge;

wherein said link plate has a front surface and a rear surface, and said butt-inserting portion of said link plate comprises a beveled surface formed on each of the front and rear surfaces of the link plate; and wherein said beveled surface is defined by said circumferential edge and an arc extending from one point on said circumferential edge to another point on said circumferential edge, the arc being convex when viewed from the end of said link plate opposite said one end.

\* \* \* \* \*